E. EDWIN.
TREATMENT OF GASES IN ELECTRIC FURNACES.
APPLICATION FILED FEB. 14, 1918.
1,263,390.
Patented Apr. 23, 1918.
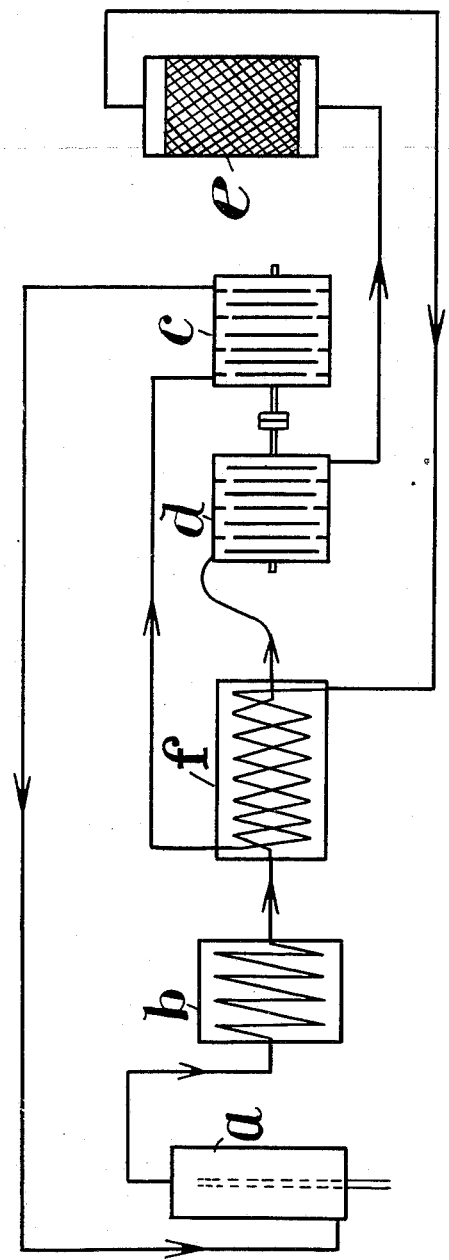
Inventor
Emil Edwin
By Henry Orth Jr
Attorney

UNITED STATES PATENT OFFICE.

EMIL EDWIN, OF CHRISTIANIA, NORWAY, ASSIGNOR TO NORSK HYDRO-ELEKTRISK KVAELSTOFAKTIESELSKAB, OF CHRISTIANIA, NORWAY.

TREATMENT OF GASES IN ELECTRIC FURNACES.

1,263,390.   Specification of Letters Patent.   Patented Apr. 23, 1918.

Original application filed August 29, 1916, Serial No. 117,492. Divided and this application filed February 14, 1918. Serial No. 217,234.

*To all whom it may concern:*

Be it known that I, EMIL EDWIN, a subject of the King of Norway, residing at Christiania, Norway, have invented certain new and useful Improvements in the Treatment of Gases in Electric Furnaces; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a method of utilizing the heat energy of gases which have been treated in electric furnaces, and is a division of my application Serial Number 117,492, filed August 29, 1916.

In the processes of nitrogen combustion, the supplied electric energy is but imperfectly utilized. Only the least part of the energy is directly transformed into chemical energy in the formation of nitrogen oxids, while the bulk is obtained as heat in the hot gases, leaving the furnace. The conditions may be improved to some degree by using high pressure in the furnaces. Then a greater yield of nitrogen oxids is obtained relatively to the expenditure of energy, but the advantage so obtained is in great measure counterbalanced by the complication that a compressor plant with consequent expenditure of energy is required to supply the air under pressure to the furnaces. Another method of obtaining an increased yield of nitrogen oxids consists in using a gas mixture richer in oxygen than the air, most profitably a mixture containing equal volumes of oxygen and nitrogen. In consideration of the cost arising from the preparation of pure oxygen one is then bound to combine the furnaces with the absorption plant and auxiliary apparatus into a closed system, in which the gases permanently circulate, the quantities of gas used being from time to time supplied. Also in this case a compressor is required in order to maintain the differences of pressure that are necessary for the circulation of the gases in the system and just the same is the case when both the said expedients for increasing the yield are simultaneously made use of in working the closed system under pressure with air rich in oxygen.

When using a closed system, one has the further possibility of effecting also the absorption of the nitrogen oxids under pressure. This involves the important advantage, that the absorption plant may be given far less dimensions and consequently be much cheaper. This advantage may be utilized still more by maintaining the absorption system under even higher pressure than the furnaces, but one faces then again the necessity of using a compressor for producing this higher pressure, so that also in this case the profit is to be purchased at expenditure of energy.

Considering on the other hand the energy contained as heat in the hot gases leaving the furnace, it is evident that this energy may be utilized in different ways, for instance for the production of steam in passing the gases through steam-boilers. However, a considerable portion of the heat content, particularly the heat remaining in the gases after their having been cooled down to 250–300° C., cannot be utilized in this way, and is until now completely lost as the gases are efficiently cooled by means of a current of water in order to bring them down to the temperature suitable for absorption.

The present invention has for its object to utilize this hitherto worthless heat energy for working the compression device, that is to maintain the differences of pressure in the system.

To this purpose the heat energy of the gases is transformed into mechanical work by continuous expansion in a hot-air turbine which drives the compressor. Provided the turbine is working adiabatically and the compressor as nearly isothermally as feasible, it will be within the range of possibility with the normal efficiencies of such machines to save ⅔ or even more of the compressor work, so that only the remaining ⅓ or less is to be supplied from external sources, for instance from an electromotor.

In order to keep the pressure as constant as possible, which is essential to the stability of the flame, it is of great importance that the velocity of the compressor should correspond to any variations in the velocity of the turbine, due to variations in the quantity of gas delivered by the furnace, the pressure, and rate of expansion. This may be realized in using a rotary compressor placed directly on the driving shaft of the turbine. Small variations of pressure will moreover be equalized on account of the relatively large volume of the absorption plant.

The manner in which the invention is carried out is shown diagrammatically in the annexed drawing, in which $a$ indicates the furnace, $b$ a device, for instance a boiler, for cooling the hot furnace gases under simultaneous utilization of a great deal of their heat, $c$ is the translating device operating by continuous expansion, such as a hot-air turbine, $d$ the rotary compressor placed on the turbine shaft and $e$ the absorption plant.

I have shown a closed system in which the absorption plant stands under higher pressure than the furnace. In this case the gases from the furnace first, after giving up the greater portion of their heat, for example to the steam boiler $b$ then pass to a heat exchanging device $f$, where they are cooled and then to the compressor $d$, which brings the pressure up to that of the absorption plant $e$. The cooler gases issuing from the latter return through the second cooling stage in the heat exchanger $f$ in which they are heated by means of the above mentioned gases from $b$ and then pass on to the turbine, where the gases expand to the pressure prevailing in the furnace.

The oxygen and the nitrogen to replace the quantity of combined oxygen and nitrogen withdrawn from circulation in the closed system by absorption in $e$ are introduced into the system under pressure. In order to do this, use is made of an electric motor driven compressor, not indicated.

The arrangement above described is mainly destined for the process of nitrogen combustion in electric furnaces, but it is understood, that the underlying principles may easily be modified for the use in other processes of analogous nature, i. e., processes working with a system in which hot gases are circulating and where the different parts of the system have considerable differences of pressure.

So for instance the invention may be used in the manufacture of aluminum nitrid from alumina, carbon and nitrogen. When in this and other similar processes circulating nitrogen is used, it will be necessary to insert in the system a device for eliminating the carbon monoxid from the gases, before the latter are re-used, and the system of such processes is then on a principle corresponding to that illustrated.

I claim—

1. The method of utilizing the heat energy of gases which have been treated in electric furnaces of nitrogen combustion, consisting in that the gases leaving the absorption plant, which latter stands under higher pressure than the furnace, are first conducted through a heat exchanging apparatus in which the relatively cool gases from the absorption plant are preheated by the hot furnace gases, and are then subjected to a drop of pressure between the absorption plant and the furnace thereby being caused to transform their heat energy into mechanical work in a hot-air turbine, which latter drives a rotary compressor working approximately at the same difference of pressure as the turbine and supplying the circulating gases to the absorption plant.

2. The method of utilizing the heat energy of gases that have been treated in an electric arc furnace, which comprises causing the gases to circulate in a closed system between an electric arc furnace and an absorber maintained under pressure higher that the furnace, cooling the gases after leaving said furnace, compressing the gases to the absorber pressure and then causing a drop of pressure through a translating device operating to effect the compression, said drop of pressure being substantially equal to the furnace pressure.

3. The method of utilizing the heat energy of nitrogen combustion furnaces, which comprises discharging the furnace gases through a heat absorber, compressing the cooler gases to a pressure higher than the furnace pressure, absorbing a portion of the gases at such higher pressure and continuously expanding said gases through a translating device to furnace pressure, said continuous expansion being substantially in synchronism with the aforesaid compression, and supplying the expanded gases to said furnace.

4. The method of utilizing the heat energy of electric arc furnace gases, which comprises discharging the gases from the furnace through a heat absorber, compressing the cooler gases to pressure higher than the furnace pressure, absorbing a portion of said gases at such higher pressure, reheating the residual gases and continuously expanding them to furnace pressure through a translating device operating in synchronism with the compression and delivering the expanded residual gases to the furnace.

5. The method of utilizing the heat energy of electric arc furnace gases which comprises absorbing heat from the gases discharged from the furnace in two stages, compressing the cooled gases to a pressure higher than their initial pressure, absorbing a portion of said gases at such higher pressure, reheating the gases in one of said cooling stages, causing a continuous expansion of said residual gases through a translating device operating in synchronism with said compression down to furnace pressure, discharging said gases into the furnace and introducing compressed gases into the circuit sufficient to compensate for the absorption.

6. The method of utilizing the heat energy of electric arc furnace gases, which comprises absorbing heat from the gases discharged from the furnace in two stages, compressing the cooled gases to a pressure higher than their initial pressure, absorbing a portion of said gases at such higher pressure, reheating the gases in the second of said cooling stages, causing a continuous expansion of said residual gases through a translating device operating in synchronism with said compression down to furnace pressure, discharging said gases into the furnace and introducing compressed gases into the circuit sufficient to compensate for the absorption.

In testimony that I claim the foregoing as my invention, I have signed my name.

EMIL EDWIN.